C. C. HARBRIDGE.
DEMOUNTABLE RIM.
APPLICATION FILED DEC. 29, 1913.
1,165,096. Patented Dec. 21, 1915.
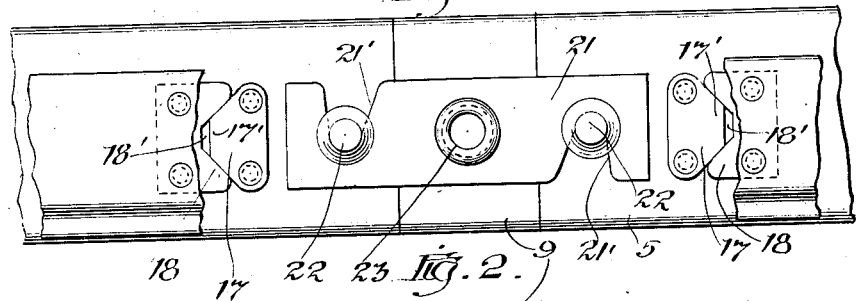
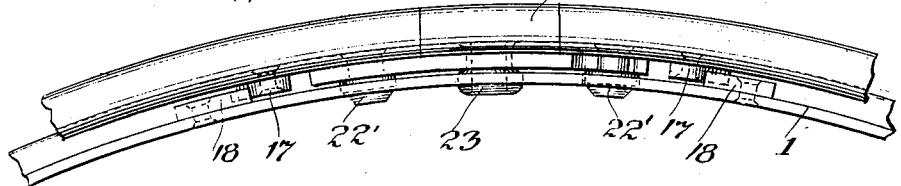
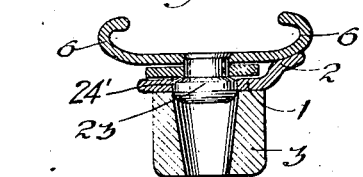
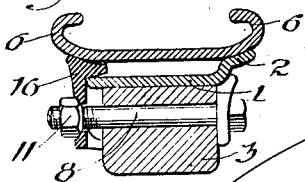
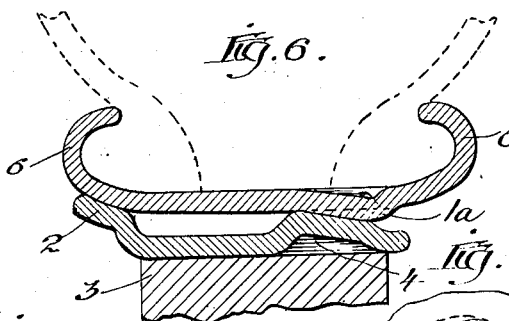
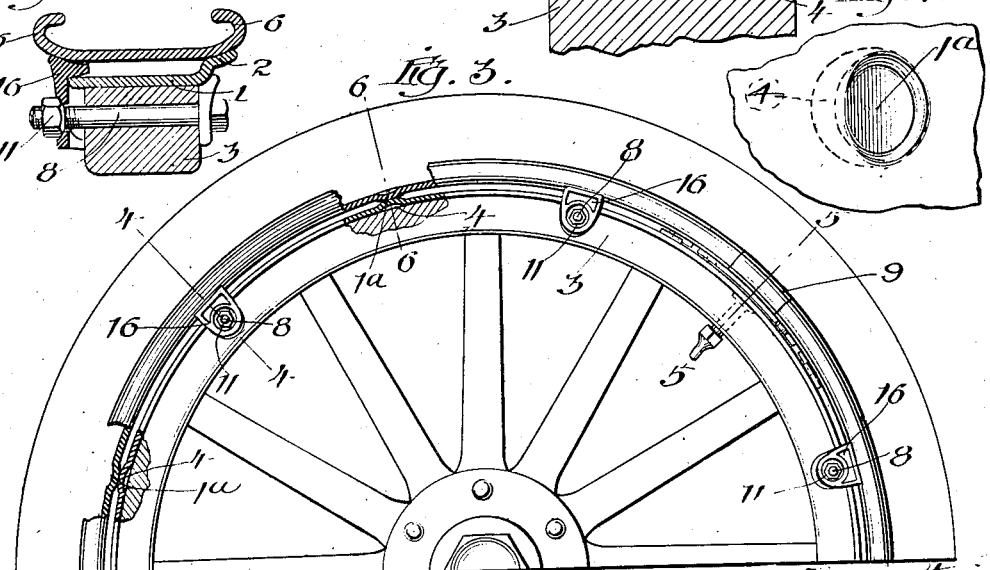
Witnesses:
Frank P. Blanchard
L. O. French
Inventor:
Chester C. Harbridge
By Fred Gerlach
His Attorney.

UNITED STATES PATENT OFFICE.

CHESTER C. HARBRIDGE, OF DETROIT, MICHIGAN, ASSIGNOR TO DETROIT DEMOUNTABLE RIM CO., OF DETROIT, MICHIGAN, A CORPORATION OF MICHIGAN.

DEMOUNTABLE RIM.

1,165,096.          Specification of Letters Patent.      Patented Dec. 21, 1915.

Application filed December 29, 1913. Serial No. 809,140.

*To all whom it may concern:*

Be it known that I, CHESTER C. HARBRIDGE, a resident of Detroit, in the county of Wayne and State of Michigan, have invented certain new and useful Improvements in Demountable Rims, of which the following is a full, clear, and exact description.

The invention relates to wheels with demountable tire rims and one object thereof is to provide improved means for detachably holding and positioning the demountable rim on the wheel body.

Another object of the invention is to provide an improved locking device for securing a split-rim on a wheel body so that both ends of the rim adjacent the split will be rigidly locked to the wheel against relative lateral movement and against separation by the wedges usually employed for securing the rim on the wheel.

Another object of the invention is to dispense with the necessity of securing lugs or plates to the rim or the band on the wheel for the purpose of spacing the rim on the wheel and providing bearings for the inner faces of the rim, and this object is obtained by outwardly pressing or denting portions of the band which is rigid on the wheel before the band is fitted to the wheel felly.

Lastly, the invention designs to provide an improved construction for supporting a demountable rim on the wheel-body.

The invention consists in the several novel features hereinafter set forth and more particularly defined by claims at the conclusion hereof.

In the drawings: Figure 1 is a plan view of the rim joint, part of the felly band being broken away. Fig. 2 is a side elevation of a portion of the rim and felly band at the joint of the rim. Fig. 3 is a side elevation of a wheel embodying the invention, parts being broken away. Fig. 4 is a section taken on the line 4—4 of Fig. 3. Fig. 5 is a section taken on the line 5—5 of Fig. 3. Fig. 6 is a section taken on the line 6—6 of Fig. 3 showing the tire in place on the rim. Fig. 7 is a detail plan of the portion of the rim adjacent the line 6—6 of Fig. 3.

The wheel comprises a felly 3 and a metallic band 1 which is rigidly secured to the felly. This band is provided with a seat-flange 2 for one side of the demountable rim. Bolts 8 are secured in the felly and wedge lugs 16 adapted to be clamped between the rim and band and against one of the sides of the rim by nuts 11, to removably secure the rim on the wheel. Wedge lugs 16 fit between the rim and band 1, which necessitates a space between the periphery of the band and the inner face of the rim. Heretofore, it has been the practice to secure plates or studs either on the band or on the rim, or both, to provide bearings for the rim against flexure of the rim between the wedge lugs when the rim is on the wheel. The present invention dispenses with the necessity of these plates by indenting the band, as at 4, to provide bearings for the inner face of the rim and by indenting the rim as at 1ᵃ. These indented portions, besides avoiding the necessity of securing studs or plates to the band or rim, avoid the necessity of drilling the band or rim for attachment of the studs or pivots for the plates. The bearing-faces of these indented portions are inclined to cause the rim to easily slip into place and to avoid unnecessary clearance and thereby produce a snug fit between these faces, which will avoid squeaking when the wheel is running over the road.

The rim is adapted to hold a pneumatic tire of usual construction and comprises a main strip 5 which is formed with integral tire-engaging side-flanges 6 and with a gap. A filler-section 9 for said gap is formed with integral corresponding tire-holding flanges and is adapted to be removed to permit the ends of the main strip to be flexed in removing the rim from the tire, or in placing a tire thereon. This filler-piece has pivoted thereto a plate 21 which is formed with hooks 21' adapted to engage studs 22 on the ends of the main strip, respectively, and to lock said ends against longitudinal play. These studs 22 are provided with enlarged heads 22' which are adapted to enter openings or recesses formed in band 1 to position the rim on the wheel when placed thereon. The tire-valve extends through an opening formed in a hollow rivet 23 which pivotally connects plate 21 and the filler-section. Said rivet has an outwardly projecting head which will pass into a hole 24' formed in the band 1 and felly 3 of the wheel-body to lock the filler-piece to the wheel-band when the rim is on the wheel-body.

In practice it has been found that it is desirable to provide interlocking means between the ends of a split rim or one having a gap formed therein, and in the wheel-band, whereby both ends will be locked against lateral movement relatively to the band 1 and relatively to each other and to prevent excessive spreading by the wedge-lugs. For this purpose, plates 17 are secured to the inner face of the ends of the main strip 5 of the rim respectively and plates 18 are riveted on the outer face or periphery of band 1. These plates are adapted to fit in the space formed between the base of the rim and the periphery of wheel band 1, so that they will also serve as bearing plates between the rim and the band. To secure a rim against lateral movement on the band, plates 17 are provided with V-shaped or tapered ends 17' which fit respectively into correspondingly shaped recesses 18' in the plates 18 when the rim is placed upon the band. These V-shaped terminals exemplify an interfitting-connection between the rim and the wheel-band which will secure the ends of the main strip against relative lateral movement on the band and against spreading sufficiently to leave gaps between the filler-section and the rim-ends.

When a tire is to be placed on the rim, filler-section 19 may be removed by releasing plate 21 from the studs 22 so that the ends of the main strip 5 of the rim may be flexed to facilitate placing the rim in the tire or removing it therefrom. When the plate 21 is in operative position and the rim with the tire thereon is secured to the wheel, the interfitting ends of plates 17 and 18 will secure the rim against lateral movement in either direction and the indented portions 4, 1ª of the band will provide bearing surfaces between the rim and the band. In placing the rim on the wheel, the rim is angled laterally while the tire-valve drops into its opening in the wheel, and plates 17 drop between plates 18 on the band. Then the rim is swung laterally into position around the wheel-band when the inclined bearing faces of the band and the rim will pass into engagement. The wedge lugs are then forced into the space between the band for the rim by nuts 18. When the rim is thus secured on the wheel, the rim ends will be secured against relative transverse movement or so that their ends cannot be shifted out of alinement, by the interlocking plates 17, 18. It sometimes occurs, in practice, that there is a little looseness or wear between studs 22 and the locking plate 21. The interlocking plates 17 and 18, besides holding the rim ends alined when the rim is on the wheel, serve to limit the expansion of the rim in event of this looseness.

The invention is not to be understood as restricted to the details set forth, since these may be modified within the scope of the appended claims without departing from the spirit and scope of the invention.

Having thus described my invention, what I claim as new, and desire to secure by Letters Patent, is:

1. The combination with a wheel body, of a tire rim adapted to extend around the body with a space between the periphery of the wheel body and the inner face of the rim, interlocking devices between the rim and the wheel comprising elements secured on and projecting from the inner face of the rim and the outer face of the wheel-body, respectively, and having recessed and interfitting ends, respectively, to secure the rim against lateral and longitudinal movement on the wheel-body, and means independent of said devices for removably securing the rim on the wheel-body.

2. The combination with a wheel body, of a transversely split tire rim adapted to extend around the body with a space between the periphery of the wheel body and the inner face of the rim, interlocking devices between the rim ends and the wheel, each device comprising elements secured on and projecting from the inner face of the rim and the outer face of the wheel body respectively and having recessed and interfitting ends respectively to secure the rim ends against relative lateral and longitudinal movement on the wheel body, and means for securing the rim on the wheel.

3. The combination with a wheel body having a metallic band thereon, of a tire rim of greater diameter than the periphery of the band to leave a space therebetween, the band having outwardly extending indented bearing portions for the rim spaced from one another and disposed adjacent one side of the band, and devices independently of said bearing portions for securing the rim on the band.

4. The combination with a wheel body having a metallic band thereon, of a tire rim of greater diameter than the periphery of the band to leave a space therebetween, the rim having inwardly extending indented bearing portions for the band spaced from one another and disposed adjacent one side of the band, and devices independently of said bearing portions for securing the rim on the band.

5. The combination with a wheel body, having a metallic band thereon, of a tire rim of greater diameter than the periphery of the band to leave a space therebetween, the rim having inwardly extending indented bearing-portions, the band having outwardly bent bearing-portions on its periphery for the bearing-portions on the rim, the outer faces of the bent portions on the band being in contact with the inner faces of the bearing portions on the rim, and means for securing the rim on the band.

6. The combination with a wheel body, having a metallic band thereon, of a tire rim of greater diameter than the periphery of the band to leave a space therebetween, the rim having inwardly extending indented bearing portions and the band having outwardly bent bearing-portions on its periphery for the bearing-portions on the rim, the inner faces of the bearing portions on the rim and the outer faces of the bearing portions on the band being in contact and being inclined to permit lateral movement of the rim on the wheel, and means for securing the rim on the band.

CHESTER C. HARBRIDGE.

Witnesses:
   MILDRED STUMPF,
   ETHEL GERLACH.